United States Patent [19]
Flisch

[11] 3,955,258
[45] May 11, 1976

[54] MULTIPLE-PURPOSE MACHINE TOOL
[75] Inventor: Hermann Flisch, Maienfeld, Switzerland
[73] Assignee: Eunipp AG, Zug, Switzerland
[22] Filed: Aug. 30, 1974
[21] Appl. No.: 502,002

[30] Foreign Application Priority Data
Sept. 14, 1973 Switzerland.................. 13194/73

[52] U.S. Cl................................. 29/38 R; 29/564
[51] Int. Cl.$^2$....................................... B23P 23/00
[58] Field of Search.............. 29/38 A, 38 B, 38 R, 29/564; 82/3, 2.5; 408/39, 234, 71

[56] References Cited
UNITED STATES PATENTS

| | | | |
|---|---|---|---|
| 1,918,538 | 7/1933 | Hallenbeck | 408/39 X |
| 3,344,694 | 10/1967 | White | 82/3 |
| 3,385,138 | 5/1968 | Wusteney et al. | 408/71 X |
| 3,535,962 | 10/1970 | Ledergerber | 82/3 |
| 3,587,370 | 6/1971 | Porath | 82/3 |
| 3,798,720 | 3/1974 | Ledergerber et al. | 29/38 B |
| 3,817,650 | 6/1974 | Reich et al. | 408/234 |
| 3,851,991 | 12/1974 | Walker | 408/37 |

Primary Examiner—Othell M. Simpson
Assistant Examiner—William R. Briggs
Attorney, Agent, or Firm—Michael J. Striker

[57] ABSTRACT

A multiple-purpose machine tool wherein two spaced-apart upright frame members support three horizontal guide members which are disposed one above the other. The uppermost and lowermost guide members support two disks which are adjustable lengthwise thereof and flank an indexible drum for a group of equally spaced work clamping devices. The disks support the drum for indexing movement about a horizontal axis but prevent the drum from moving axially. Each guide member supports, at each side of the drum, several carriages each having a main slide which is movable lengthwise and a cross slide which is movable transversely of the respective guide member. At least some cross slides carry discrete motors which can rotate the respective tools and at least some clamping devices can be rotated by a drive which derives motion from the main prime mover of the machine tool. The indexing mechanism for the drum has a separate prime mover, and this separate prime mover can transmit motion to drives for the slides of the carriages.

12 Claims, 5 Drawing Figures

MULTIPLE-PURPOSE MACHINE TOOL

BACKGROUND OF THE INVENTION

The present invention relates to improvements in multiple-purpose machine tools, especially to improvements in engine lathes or analogous machine tools which can be utilized to perform turning, grinding, milling, boring, drilling and analogous operations.

It is already known to provide the housing or frame of an engine lathe with two upright frame members which flank a working or treating station and each of which supports one or more holders for turning and/or boring tools. The workpieces are mounted on an indexible carrier which is disposed between the frame members. A drawback of such machine tools is that the number of different treatments is limited, that the tools and/or workpieces are not readily accessible, and that the descent, collection and/or removal of chips and shavings presents serious problems.

SUMMARY OF THE INVENTION

An object of the invention is to provide a novel and improved multiple-purpose machine tool whose versatility is superior to that of heretofore known machine tools.

Another object of the invention is to provide a general all-purpose machine tool with novel and improved means for mounting and feeding a wide variety of boring, turning and analogous tools.

A further object of the invention is to improve the conditions for descent, accumulation and/or collection of chips in a multiple-purpose machine tool.

An additional object of the invention is to provide an improved all-purpose machine tool of the type wherein workpieces are indexible between two sets of tool holders.

The invention is embodied in a multiple-purpose machine tool, particularly in an engine lathe for turning, boring, drilling, grinding and/or milling of metallic workpieces. The machine tool comprises a frame or housing having a base and two spaced-apart frame members which flank a working station, an indexible work supporting carrier which is located at the working station and has a plurality of preferably equally spaced work-clamping or gripping devices movable along an endless path in response to indexing of the carrier, a plurality of elongated guide members mounted in the frame members and extending across the working station in substantial parallelism with the axis of the carrier, a plurality of tool carriages mounted on and movable with respect to the guide members, and a pair of holders mounted on some or all of the guide members at the opposite sides of the carrier. The carrier is mounted on and is confined by the holders for indexing movement therebetween, i.e., the carrier is preferably held by the holders against axial movement. However, it is within the purview of the invention to make the holders adjustable lengthwise of their guide members so that the carrier can be moved nearer to the one or the other frame member.

The guide members may include one or more guide members which are outwardly adjacent to the path of movement of the work clamping devices, and at least one guide member which is inwardly adjacent to the path for the work clamping devices. For example, and if the path is located in a vertical plane, a first horizontal guide member may be mounted above such a path, a second horizontal guide member can be mounted below such path, and a third horizontal guide member may be mounted in the region of the axis of the carrier between the first and second guide members.

The novel features which are considered as characteristic of the invention are set forth in particular in the appended claims. The improved machine tool itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
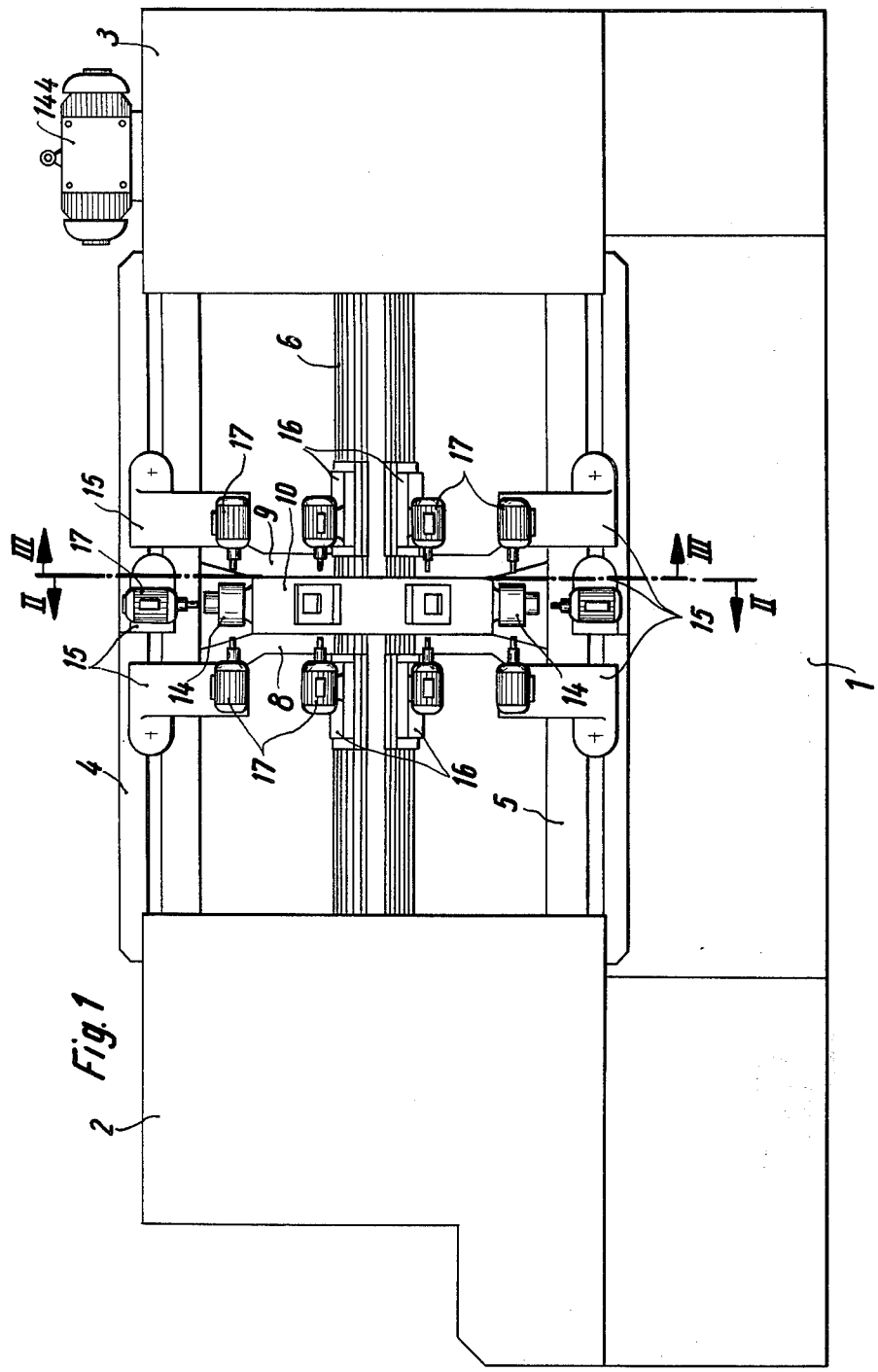
FIG. 1 is a schematic elevational view of a machine tool which embodies the invention.
Figure 4:
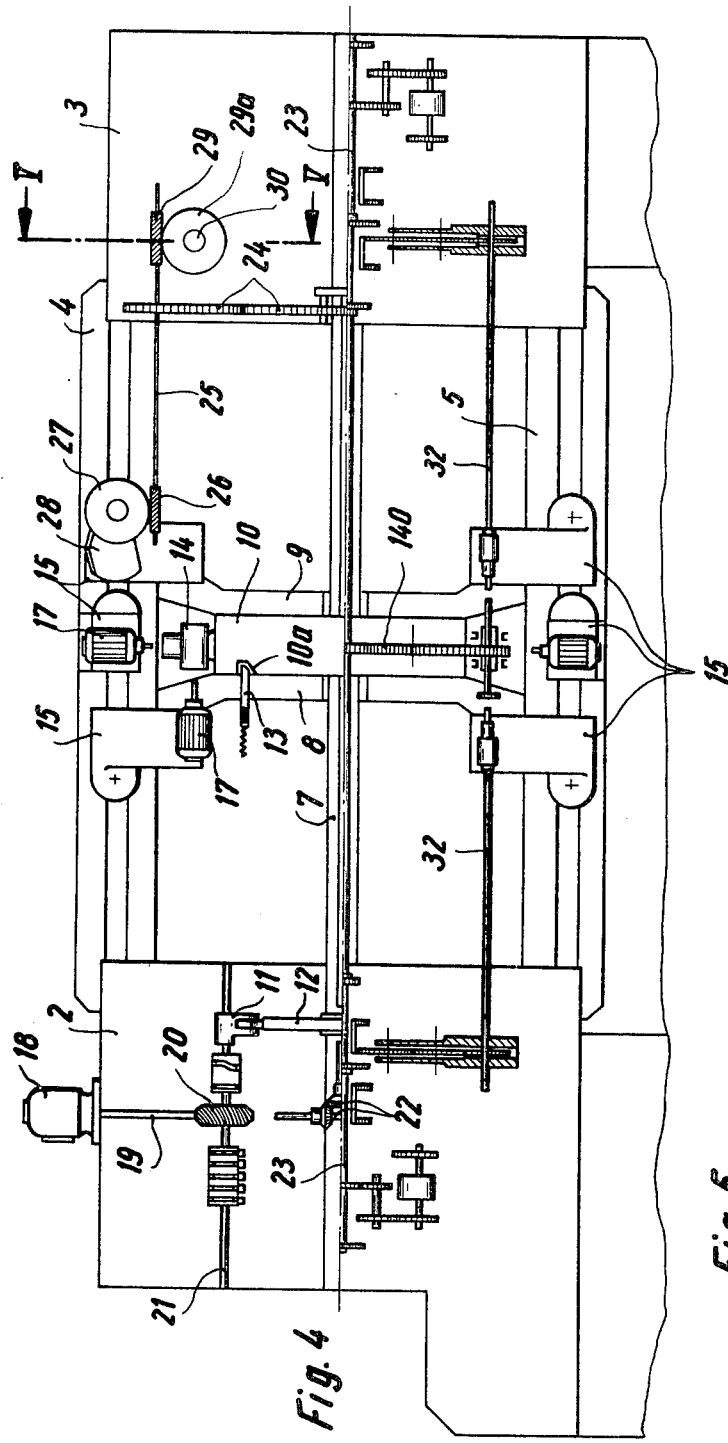
FIG. 4 is a fragmentary diagrammatic longitudinal vertical sectional view of the machine tool.

FIGS. 1 and 4 show a machine tool having a frame or housing which includes a base or bed 1 and two spaced-apart upright frame members 2 and 3 extending upwardly from the bed. The frame members 2, 3 are disposed at the opposite ends of a working or treating station and are connected to each other by horizontal guide members 4, 5 and 6 which respectively serve to guide tool supporting carriages 15 and 16. The guide members 4, 5 and 6 extend across the working station and are parallel to a centrally mounted shaft 7 which can index a work-supporting carrier or drum 10. The latter is mounted between two upright disk-shaped holders 8, 9 each of which is secured to the guide members 4 and 5. The drum 10 is held against axial movement with respect to the holders 8, 9 in a direction lengthwise of the shaft 7. The means for indexing the drum 10 through the medium of the shaft 7 comprises a geneva movement 11, 12 shown in the left-hand portion of FIG. 4. The geneva movement is installed in the interior of the hollow frame member 2. A spring-biased arresting bolt 13 is provided to penetrate into one of several recesses 10a when the drum 10 is moved to a selected angular position. The bolt 13 is reciprocable in the holder 8.

Figure 2:
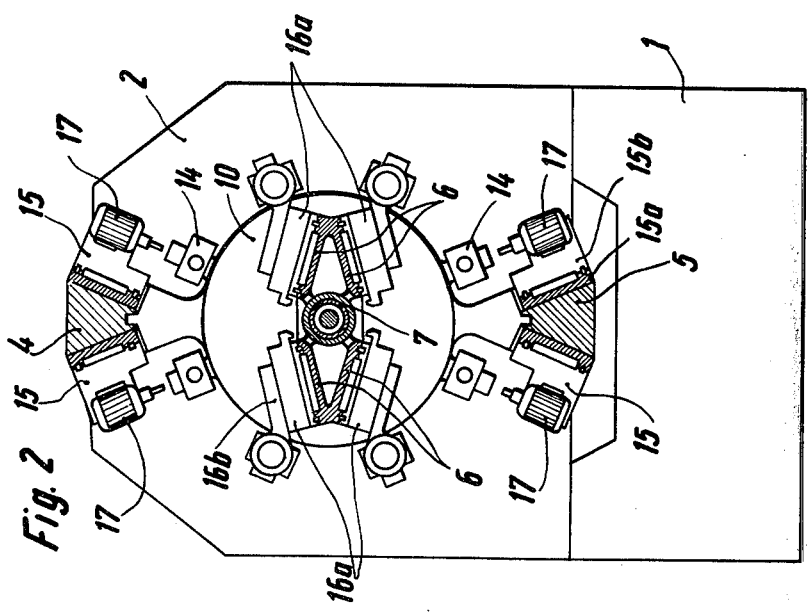
FIG. 2 is a fragmentary transverse vertical sectional view as seen in the direction of arrows from the line II—II of FIG. 1.

The work clamping devices 14 are mounted on the drum 10 and are preferably equally spaced from each other. At least some of the clamping devices 14 are rotatable with respect to the drum 10, and the rotary work clamping devices can be coupled to a drive 140. As shown in FIG. 2, the devices 14 are mounted at the periphery of the drum 10. The drive 140 receives motion from a main prime mover 144 which is an electric motor mounted on top of the hollow frame member 3.

Figure 3:
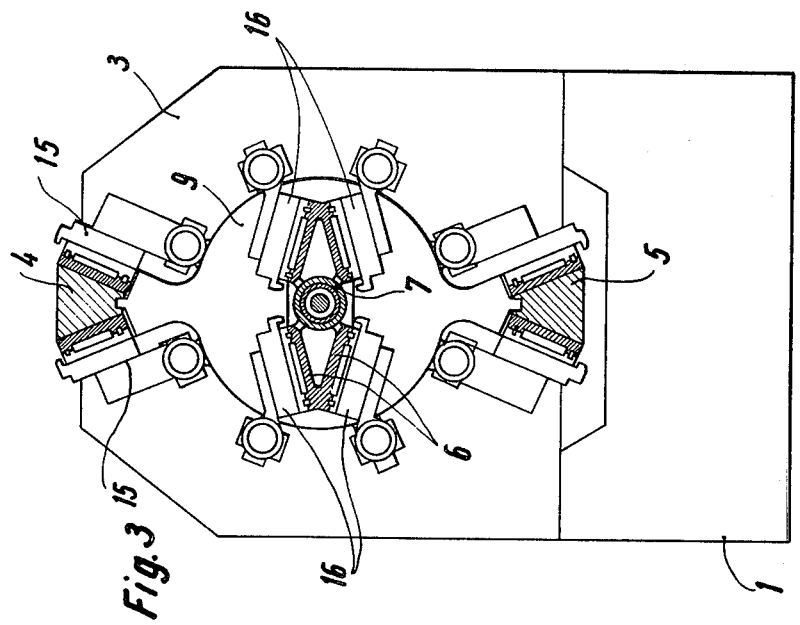
FIG. 3 is a fragmentary transverse vertical sectional view as seen in the direction of arrows from the line III—III of FIG. 1.

As shown in FIGS. 1 to 3, each of the guide members 4, 5 supports at least four and preferably six discrete tool carriages 15. The guide members 4 and 5 are outwardly adjacent to the endless path along with the work clamping devices 14 are moved by the indexible drum 10. The guide members 6 is inwardly adjacent to the path of movement of clamping devices 14 on the drum 10 and supports four to six tool carriages 16 at each side of the drum. Each of the tool carriages 15, 16 preferably includes a main or first slide 15a, 16a which is movable lengthwise of the respective guide member and a second slide or cross slide 15b, 16b which is movable transversely of the respective guide member and supports a holder for the tool. The cross slides 15b, 16b of the carriages 15, 16 may support holders for stationary tools or they may be equipped with discrete motors 17 for rotary tools. For example, the motors 17 can drive rotary boring, milling or drilling tools. He is also within the purview of the invention to omit some or all of the motors 17 and to rotate tools on selected carriages 15, 16 by way of a drive 32 (shown in FIG. 4) which derives motion from the main prime mover 144. The drive 32 comprises a system of shafts and gear trains.

The geneva movement 11, 12 is driven by a separate electric motor 18 (FIG. 4) which is mounted on the frame member 2. The output shaft 19 of the motor 18 carries a worm 20 meshing with a worm wheel on a central shaft 21. The output shaft 19 further drives a shaft 23 through the medium of bevel gears 22, and the shaft 23 is rotatable in the above-mentioned indexing shaft 7 for the drum 10. The end portions of the shaft 23 drive gear trains 24 for shafts 25 which serve to feed the slides of the carriages 15, 16 lengthwise and/or transversely of the respective guide members 4, 5 and 6. The shafts 25 are parallel to the guide members. As shown in the upper right-hand portion of FIG. 4, a shaft 25 may drive a worm 26 in mesh with a worm wheel 27 which can rotate a cam 28 serving to displace the cross slide of one or more adjacent carriages 15, 16.

Figure 5:
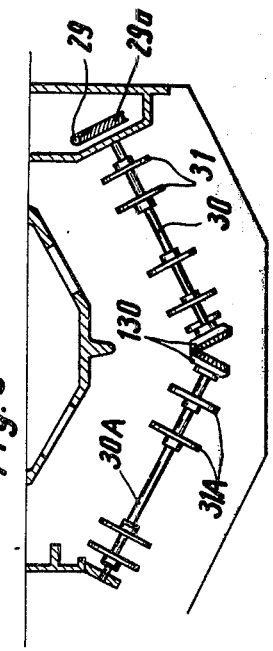
FIG. 5 is a fragmentary sectional view substantially as seen in the direction of arrows from the line V—V of FIG. 4.

The shafts 25 can further move the main slides 15a, 16a of the carriages 15, 16 (i.e., those slides which move lengthwise of the respective guide members 4, 5 and 6). As shown in upper right-hand portion of FIG. 4, a shaft 25 can carry a second worm 29 meshing with a worm wheel 29 a on a shaft 30 which carries a set of disk-shaped cams 31 (FIG. 5). The cams 31 can displace elongated rods or followers which are coupled to the main slides 15a, 16a of the respective carriages 15 and/or 16. The camshaft 30 of FIG. 5 drives a second camshaft 30A with cams 31A through the medium of a set of bevel gears 130. It is further clear that the slides of the carriages 15 and/or 16 can be moved by hydraulic or pneumatic motors or by a programming system of any known design. As shown in FIGS. 2 and 3, the guide members 4 and 5 are respectively located above and below the endless path of movement of work clamping devices 14, and the guide member 6 is located substantially midway between the guide members 4, 5. The drum 10 may be an annulus which is rotatably mounted in the holders 8, 9 so that it surrounds the median guide member 6, and the holders 8, 9 are preferably adjustable lengthwise of the guide members 4, 5 so as to move the drum 10 nearer to the frame member 2 or 3.

FIG. 4 shows that the drive 140 for one or more work clamping devices 14 is located substantially centrally of the working station. This drive has a set of gears which drive the rotary parts of selected clamping devices 14 and are preferably movable toward the frame member 2 or 3 in response to axial shifting of the holders 8, 9 with the drum 10.

An important advantage of the improved machine tool is that the carriers 15, 16 for the tools are mounted on the guide members 4, 5, 6 rather than on the frame members of the housing.

The mounting of carriers 15, 16 on the frame members 2, 3 would reduce the versatality of the machine and would interfere with descent, accumulation and/or removal of shavings and chips.

Without further analysis, the foregoing will so fully reveal the gist of the present invention that others can, by applying current knowledge, readily adapt it for various applications without omitting features which fairly constitute essential characteristics of the generic and specific aspects of my contribution to the art and, therefore, such adaptations should and are intended to be comprehended within the meaning and range of equivalence of the claims.

I claim:

1. In a multiple purpose machine tool, particularly in a machine tool for turning, boring, drilling, grinding and/or milling of metallic workpieces, a combination comprising a frame having two spaced-apart frame members flanking a working station; an indexible work supporting carrier located at said station and having a plurality of work-clamping devices movable along an endless path in response to indexing of said carrier; a pair of disk-shaped holders at opposite sides of the carrier and confining the latter for indexing movement therebetween; a plurality of elongated guide members extending in substantial parallelism with the axis of said carrier, fixed at outer ends to said frame members and rigidly connected to each other by said holders; at least one of said guide members being located outwardly adjacent to said endless path and at least one other guide member being located inwardly adjacent to and at opposite sides of said endless path; and a plurality of tool carriages mounted on and movable longitudinally of said guide members so that said tool carriages are respectively located inwardly to opposite sides of said endless path and outwardly adjacent to said endless path.

2. A combination as defined in claim 1, wherein said carrier is a drum.

3. A combination as defined in claim 1, wherein said carrier is indexible about a substantially horizontal axis and said endless path is located in a substantially vertical plane, said guide members including a first substantially horizontal guide member located above said paths, a second substantially horizontal guide member located below said path, and a third substantially horizontal guide member located in the region of said axis between said first and second guide members.

4. A combination as defined in claim 1, wherein at least one of said work clamping devices is rotatable and further comprising drive means mounted in said frame and operable to rotate said one clamping device.

5. A combination as defined in claim 1, wherein at least one of said tool carriages comprises a first slide which is movable lengthwise of the respective guide member and a cross slide movable with respect to said first slide substantially transversely of the respective guide member, and further comprising means for moving said slides.

6. A combination as defined in claim 1, wherein at least one of said carriages comprises means for rotating the respective tool.

7. A combination as defined in claim 1, further comprising fluid-operated drive means for moving said carriages relative to the respective guide members.

8. A combination as defined in claim 1, further comprising programming means for moving said carriages relative to the respective guide members.

9. A combination as defined in claim 1, wherein said carriages include a first set of carriages mounted on said guide members between one of said frame members and one of said holders, and a second set of carriages mounted on said guide members between the other of said frame members and the other of said holders.

10. A combination as defined in claim 9, wherein each of said sets comprises a plurality of carriages on each of said guide members.

11. The combination as defined in claim 10, including rotatable tool means on each of said carriages, the tool means on at least one of said sets comprise two means rotatable about axes parallel to the axis of said carrier and at least one tool means rotatable about an axis normal to that of said carrier.

12. A combination as defined in claim 1, and including means for indexing said carrier about the axis thereof and comprising a shaft coaxially fixed to said carrier and extending between said frame members and through said holders, and a geneva movement connected to said shaft.

* * * * *